(12) United States Patent
Pudipeddi et al.

(10) Patent No.: US 7,318,132 B2
(45) Date of Patent: Jan. 8, 2008

(54) METHOD AND APPARATUS FOR DYNAMICALLY UNLOADING FILE SYSTEM FILTERS

(75) Inventors: Ravisankar Pudipeddi, Sammamish, WA (US); Neal R. Christiansen, Bellevue, WA (US); Eileen C. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 10/461,078

(22) Filed: Jun. 13, 2003

(65) Prior Publication Data

US 2005/0044353 A1    Feb. 24, 2005

(51) Int. Cl.
*G06F 12/00* (2006.01)
(52) U.S. Cl. ...................... 711/159; 711/133
(58) Field of Classification Search ............... 711/133, 711/159; 713/155
See application file for complete search history.

(56) References Cited

U.S. PATENT DOCUMENTS

2004/0250131 A1* 12/2004 Swander et al. ............ 713/201

OTHER PUBLICATIONS

Kevin Dowd et al., "High Performance Computing, Second Edition" Jul. 1998—Chapters 10 and 12.
U.S. Appl. No. 10/315,384, filed Dec. 9, 2002, Pudipeddi et al.
U.S. Appl. No. 10/461,755, filed Jun. 13, 2003, Pudipeddi et al.

* cited by examiner

*Primary Examiner*—Reginald Bragdon
*Assistant Examiner*—Aracelis Ruiz
(74) *Attorney, Agent, or Firm*—Merchant & Gould

(57) ABSTRACT

The invention provides a system and method for dynamically unloading file system filters in a stacked-call-back model where filters are stacked one on top of the other to form a filter stack. A filter manager keeps track of the progress of each I/O operation and calls each filter in turn with the filter returning after it has completed processing the given operation. The filter manager dynamically unloads a filter (or an instance of a filter) that is positioned at any position in the filter stack in a reasonable amount of time while I/O operations are actively being processed. The filter/filter instance can be unloaded with outstanding I/O operations on the filter either hosted by the filter or pended by other filters. I/O operations are canceled, completed or drained in order to unload the filter or filter instance. A filter may veto the unloading of the filter.

45 Claims, 7 Drawing Sheets

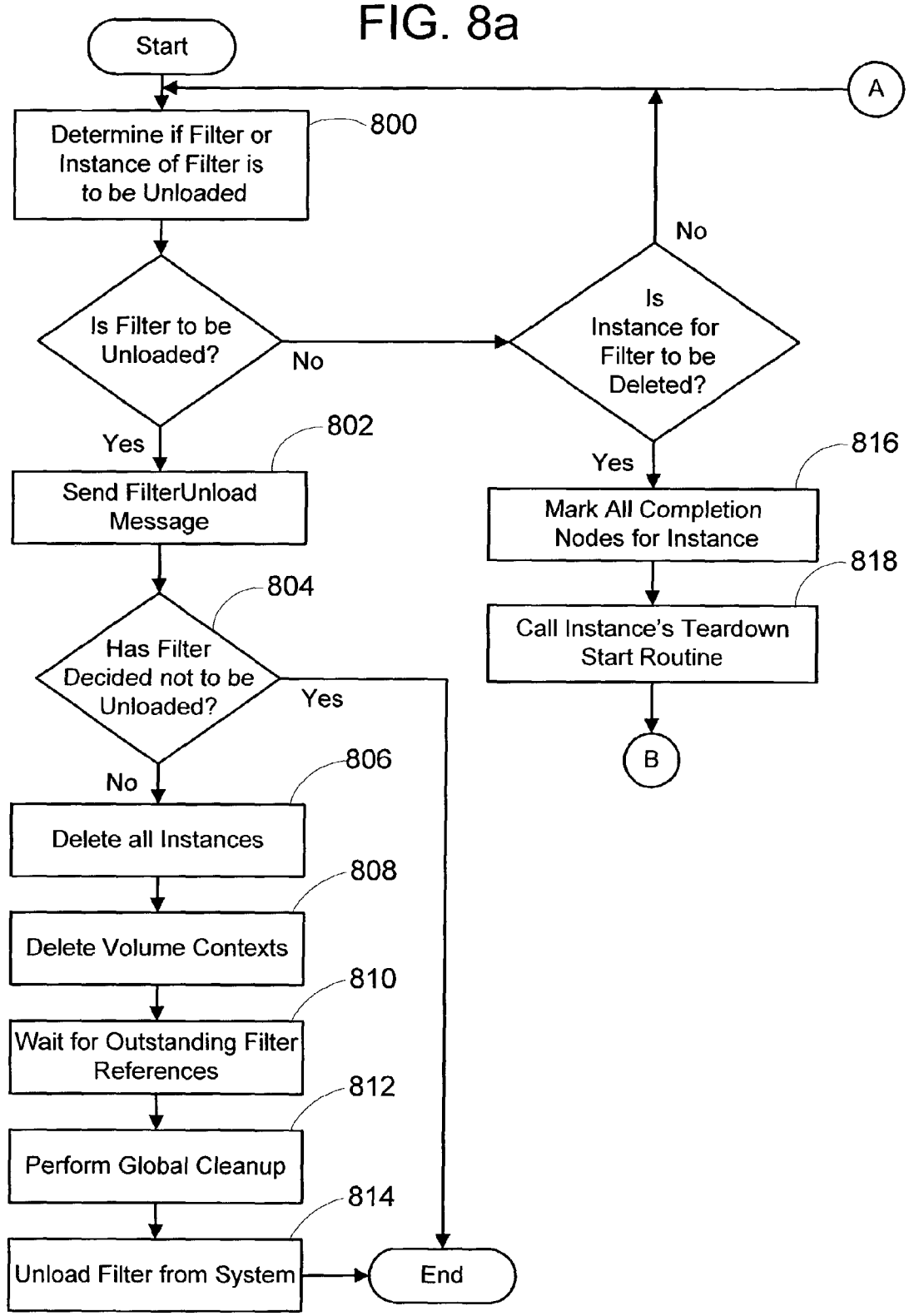

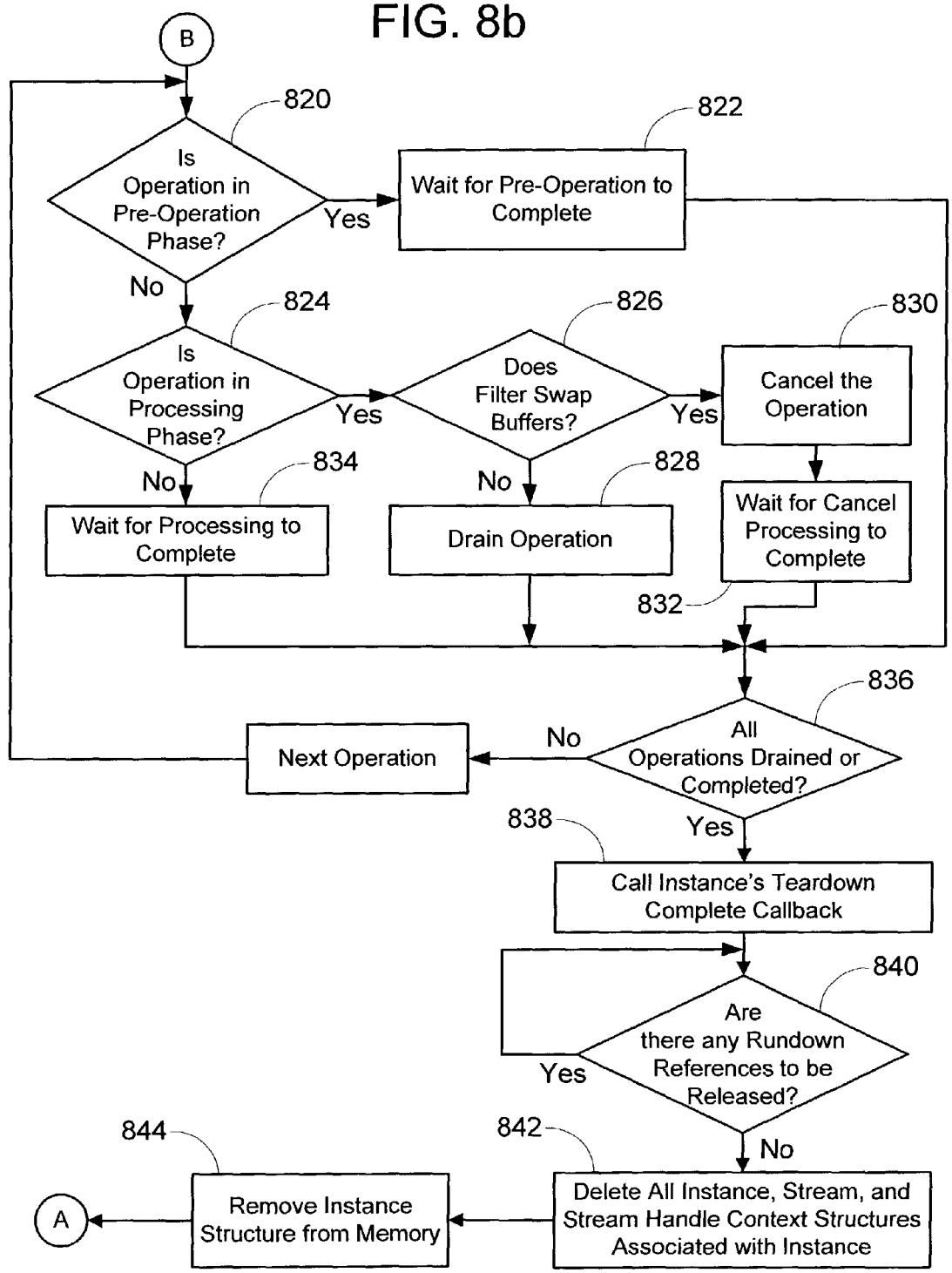

METHOD AND APPARATUS FOR DYNAMICALLY UNLOADING FILE SYSTEM FILTERS

FIELD OF THE INVENTION

This invention relates generally to file system filters and, more particularly, relates to managing file system filters.

BACKGROUND OF THE INVENTION

File system filters are used to perform some sort of processing of I/O operations as they occur in the system. For example, file system filters perform such operations as encryption and decryption, compression, read and write operations, etc. The file system filters are stacked one on top of the other, resulting in a filter stack. File system filters are difficult to implement and cannot be easily unloaded.

Systems such as the Windows NT® operating system from Microsoft Corporation use a stacked-call through model where filter system filters are stacked on top of each other. Operations such as reads and writes are sent down the stack and must pass back up through each filter in the stack as the operation is completed. In order to unload a file system filter, the operations of the filter must be complete before removing the filter. Each file system filter tracks the next device in the stack to which it will pass operations. There is no interface for safely updating a file system filter's link to the next device. As a result of this, only a filter located on top of the filter stack can be unloaded while the computer system is operating because there is no other filter in the stack referencing the top filter. For file system filters located anywhere else on the stack, the computer system must be stopped and rebooted for the filter to be removed. Otherwise, the computer system will not operate reliably. As a result, users must continually reboot when installing or removing file system filter software. The rebooting is time-consuming, inefficient, and frustrating to the user as well as computer programmers.

BRIEF SUMMARY OF THE INVENTION

The invention provides a system and method for dynamically unloading file system filters in a stacked-call-back model where filters are stacked one on top of the other to form a filter stack. An attachment of a filter to a volume is called an instance. A filter manager keeps track of the progress of each I/O operation and calls each filter in turn with the filter returning after it has completed processing the given operation. The filter manager dynamically unloads a filter (or an instance of a filter) located at any position in the filter stack in a reasonable amount of time at any time, including while I/O operations are actively being processed. The filter/filter instance can be unloaded with outstanding I/O operations on the filter either issued by the filter or pended by other filters.

When an instance of a filter is to be unloaded, the I/O operations the instance is handling are completed, drained, or canceled. An operation can be in a pre-operation phase, a processing phase, and a post operation phase. An operation is in a pre-operation phase when the instance is performing an operation before the file system processes the I/O operation. An operation is in the processing phase when the pre-operation phase has been completed and the I/O operation has been sent to the lower filters and file system for processing. An operation is in the post-phase operation when the instance has received the I/O operation after the lower filters and file system have processed the I/O operation.

If the operation is in the pre-operation phase or the post-operation phase, the filter manager waits for the operation to complete. If the operation is in the processing phase, the filter manager determines if the instance has swapped buffers. If the instance has swapped buffers, the operation is canceled and the filter manager waits for the operation to complete the cancel operation. In one embodiment, if the instance has swapped buffers and the operation is a short-lived operation, the operation is allowed to complete and the filter manager waits for the instance to do the proper handling and cleanup of the swapped buffers. If the operation is long-lived, the operation is canceled. If the instance has not swapped buffers, the operation is drained. When an operation is drained, the completion stage is called prematurely (i.e., before the operation is completed) and the filter manager does not send the operation to the instance when the operation is actually completed.

Once the operations have been completed, canceled, or drained, the instance is commanded to cancel any long lived filter initiated asynchronous I/Os (such as oplocks and directory change notifications) and close any files that are still open that were opened by the instance. The filter manager then waits for any other outstanding rundown references on the instance to be released and deletes the instance from memory and deletes all instance context structures associated with the instance, all stream context structures associated with the instance, and all stream handle context structures associated with the instance.

When a filter is to be unloaded, the filter manager determines if the filter does not want to be unloaded. If the filter allows itself to be unloaded, the filter manager deletes each instance of the filter from memory. Volume contexts associated with the filter are also deleted. After outstanding filter references (operations, timers, etc.) have been completed, the filter is commanded to perform global cleanup operations, which includes items such as deleting global resources for the filter, freeing global memory/deleting lookaside lists, and unregistering global callbacks (e.g. process and thread notify routines). The filter is then unloaded from memory.

As previously indicated, the filter manager keeps track of the progress of each I/O operation. A data structure is used to represent an I/O operation in the file system. The structure comprises a stack of completion nodes, with each completion node linked to an instance of filters in the file system. Each completion node contains a state for each filter associated with the I/O operation.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8a is a first portion of a flow chart of a method to dynamically remove a filter or an instance of a filter from a file system stack; and FIG. 8b is a second portion of the flow chart of the method to dynamically remove a filter or an instance of a filter from a file system stack.

DETAILED DESCRIPTION OF THE INVENTION

Figure 1:
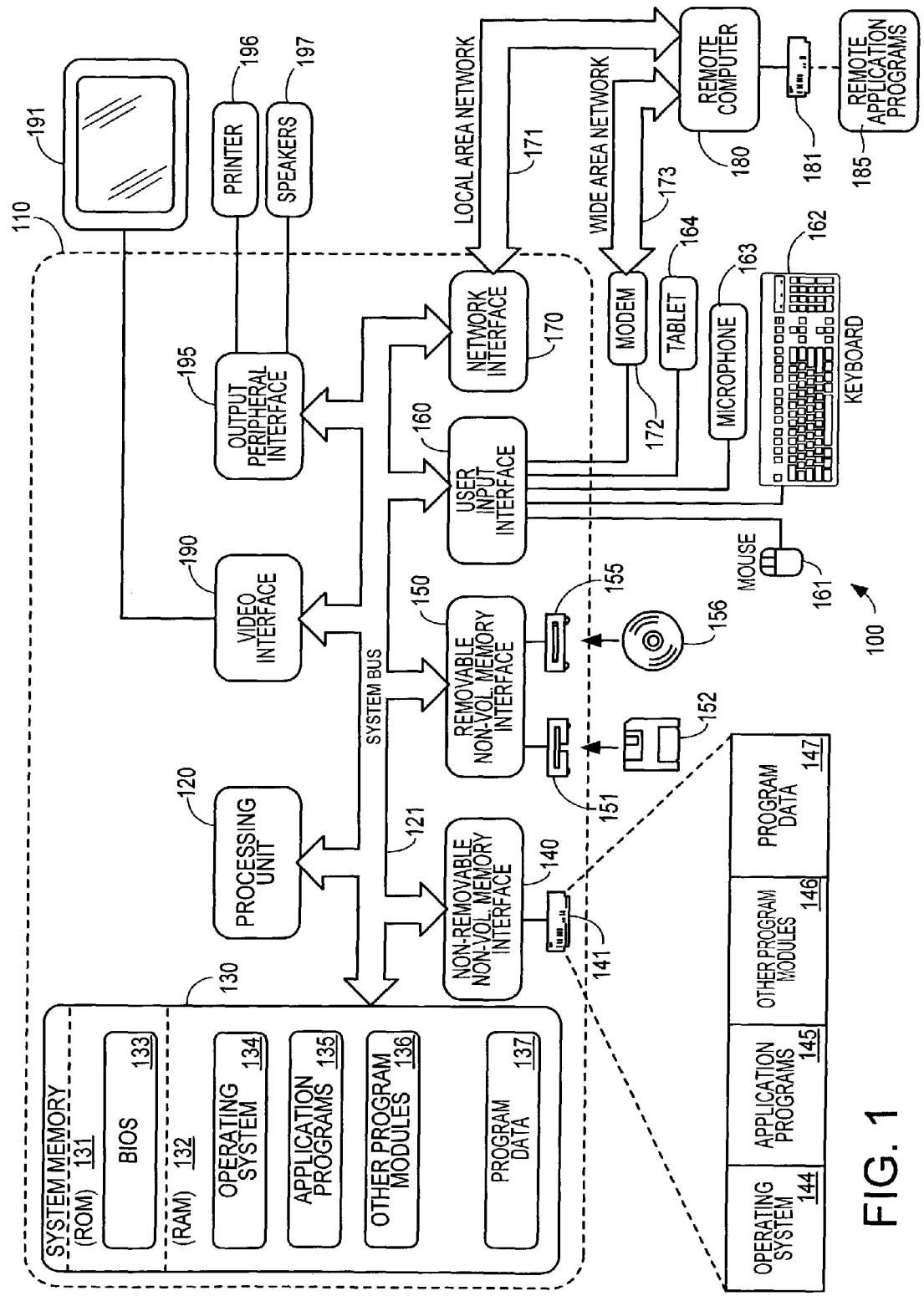
FIG. 1 is a block diagram generally illustrating an exemplary computer system on which the present invention resides.

The invention provides a system and method for unloading file system filters in a stacked-call-back model where filters are stacked one on top of the other to form a filter stack. A filter manager keeps track of the progress of each I/O operation and calls each filter in turn with the filter returning after it has completed processing the given operation. The filter manager provides the ability to dynamically unload a filter that is positioned at any position in the filter stack in a reasonable amount of time while I/O operations are actively being processed. A direct benefit of this is that the number of reboots is reduced as products are upgraded or uninstalled. The invention handles the following situations: active I/O operations inside the filter in various phases of execution; I/O operations initiated by the filter; context structures associated with file system objects, including volumes, instances, streams, and stream handles; operations that have been pended and are in a queue; operations that have been pended and are being processed by worker threads; operations where the data buffer used for an operation has been changed by the filter (such as buffer swapping); and files opened by the filter.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Prior to describing the filter/filter instance unload process, a general overview of how I/O operations flow through the filter manager of the present invention will be described. Filters register with the filter manager. When a filter registers with the filter manager, the filter specifies which I/O operations in which the filter is interested (e.g., write, read, create, close. etc.). Each filter attaches to volumes (e.g. C:, D:, E:, etc.) it is interested in filtering. An attachment to a volume is called an instance. A filter may have more than one instance attached to a given volume. All instances associated with a given volume are ordered based on their "altitude" (i.e., the location in the file system stack). A completion node structure (explained herein below) is used to track each outstanding operation for each instance.

Figure 2:
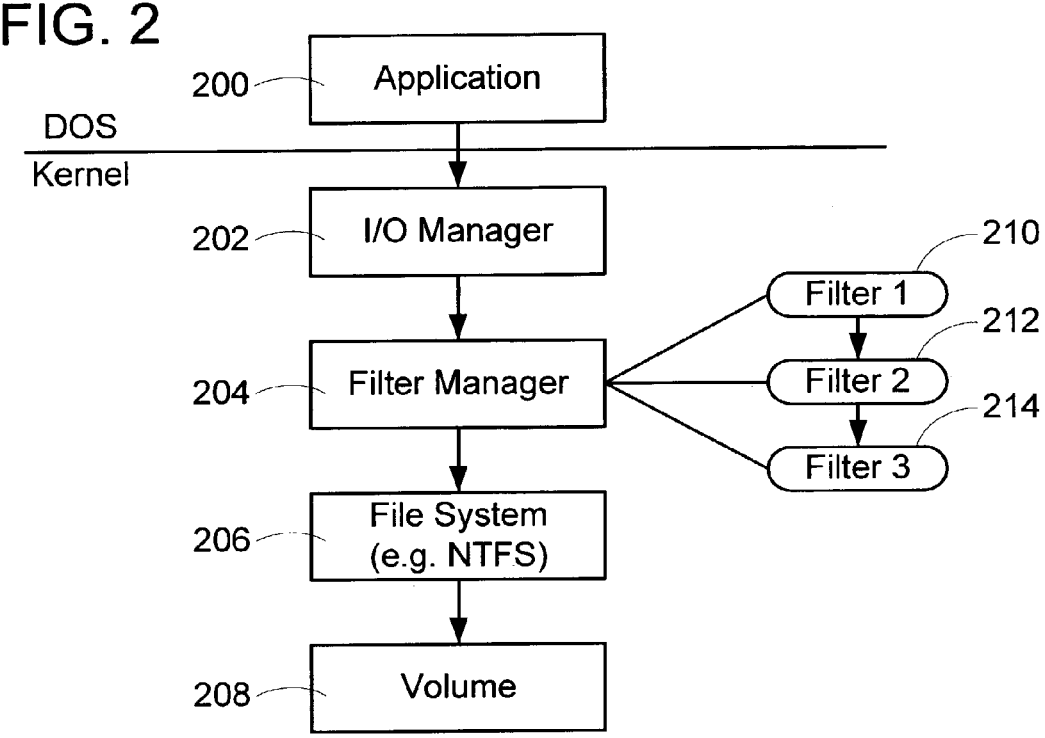
FIG. 2 is a block diagram generally illustrating an embodiment of a file system stack employing a filter manager in accordance with the teaching of the present invention.
Figure 3:
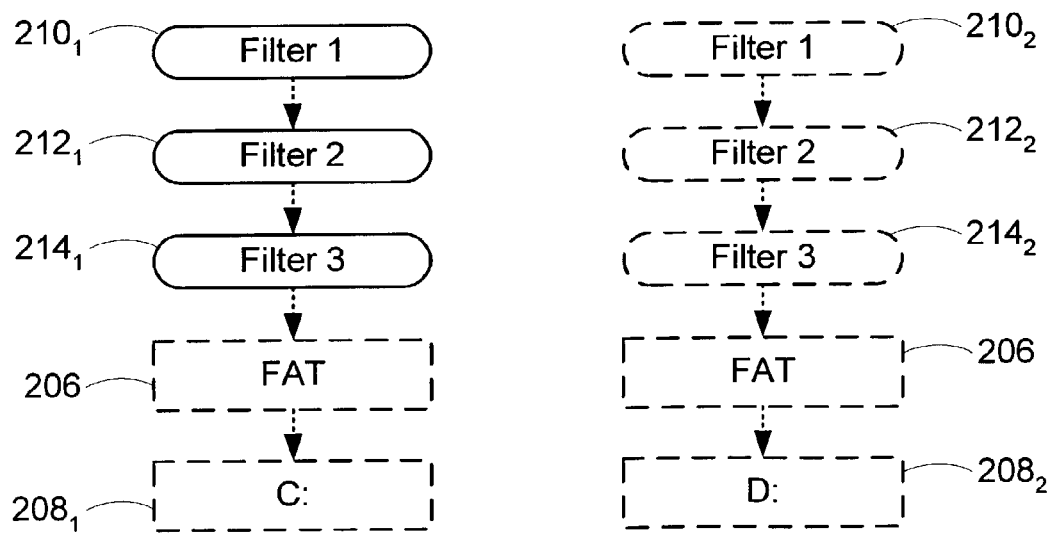
FIG. 3 is a block diagram illustrating the virtual attachment of filters to different volumes of a computer system.

During operation, all I/O operations directed at a volume are first sent to the filter manager. Based on the given I/O operation, the filter manager calls the appropriate filter's callback routines starting with the instance with the highest altitude and working down. For example, FIG. 2 illustrates the flow of a typical I/O operation. A user application 200 initiates the I/O operation such as a read operation, a write operation, and the like. Individual I/O operations are controlled by a structure called an IrpCtrl. The I/O operation flows to the I/O manager 202 and on to the filter manager 204 of the present invention. The filter manager 204 redirects an I/O operation to filters that are needed to perform some processing on the operation before the I/O operation is sent to the file system 206 and on to the volume 208. The file system is any file system, including file systems such as NTFS (New Technology File System), FAT (File Allocation Table), and the like. In FIG. 2, filters 210, 212, and 214 process the I/O operation. For example, the filters 210-214 may perform encryption, data compression, anti-virus protection, etc. As previously indicated, each filter attaches to volumes it is interested in filtering and an attachment to a volume is called an instance. FIG. 3 illustrates two instances of filters 210-214. Instances $210_1$ to $214_1$ are a first instance of the filters and are virtually attached to volume $208_1$ (e.g., C: drive) via file system 206. Instances $210_2$ to $214_2$ are a second instance of the filters and are virtually attached to volume $208_2$ (e.g., D: drive) via file system 206. Further details of the filter manager system are in U.S. patent application Ser. No. 10/315,384, filed Dec. 9, 2002, which is hereby incorporated in its entirety by reference.

Based on how a filter chooses to handle an I/O operation, each I/O operation can be in one of three phases. These phases are a Pre-Operation phase, a Processing phase, and a Post-Operation phase.

A pre-operation phase starts when a filter's pre-operation callback routine is called. An example of a pre-operation phase is an encryption filter encrypting a user's data before passing the write operation to the lower filters and file system. During the pre-operation callback each filter makes a decision on how to handle the given operation. During this phase, a filter can perform operations on data within the I/O operation, open another file, do nothing, etc. The decision is to do one of the decisions listed in table 1 below.

TABLE 1

| Decision | Description |
| --- | --- |
| Complete the operation | The filter is done processing the given operation. No additional phases are entered. |
| Done processing the operation, do not receive a callback during the post-operation phase | No additional phases are entered. The operation is passed on to the next lower filter in the instance stack. |

TABLE 1-continued

| Decision | Description |
| --- | --- |
| Done processing the operation, do receive a callback during the post-operation phase. | The operation is passed on to the next lower filter in the instance stack. |
| Pend the operation. | Block continued processing of the operation until the filter resumes processing. The operation stays in the pre-operation phase. At some later time the filter must either complete the operation or continue it's processing. |

Figure 4:
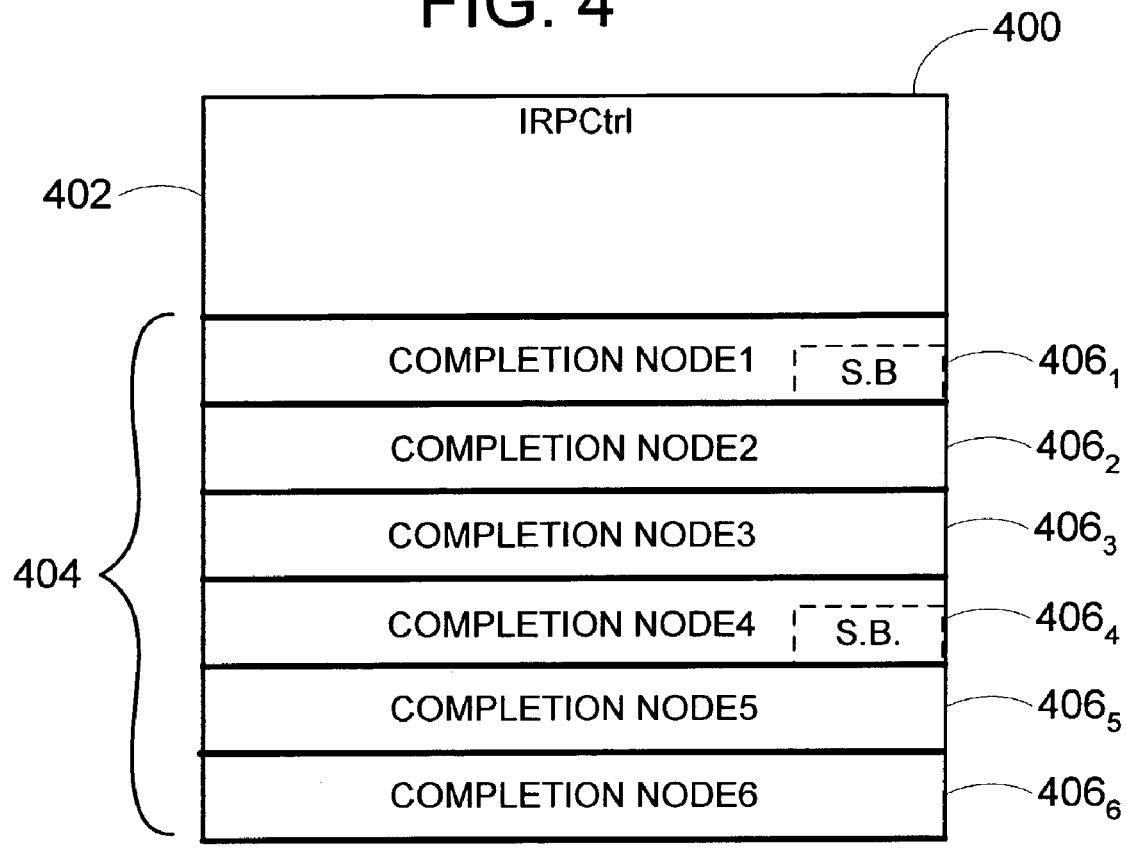
FIG. 4 is a block diagram illustrating an I/O operation structure having a completion node structure in accordance with the teaching of the present invention.

Information about which filters need to be called during the post-operation phase is kept in a completion node structure. A stack of these structures is maintained in the IRPCtrl. FIG. 4 illustrates a typical IRPCtrl 400. The IRPCtrl 400 has a section 402 that contains fields that describe operation parameters and a completion node stack 404. The completion node stack 404 has 0 or more completion nodes that form the stack. $406_1$-$406_6$ each represents a completion node for an instance of a filter that needs a call-back such as for post-operations. The completion node structure provides the state for each filter and includes a pointer to a callback node for the instance and operation the completion node represents, a link to the instance, operation context, a snapshot of parameters, and flags. The flags are used to indicate items effecting system operation such as buffer swapping. If a filter changes a state, the change to the state is also recorded. For example, FIG. 4 shows that two filters have changed a write buffer (e.g., swapped buffers) as indicated by the S.B. notation and explained below. It should be noted that an IRPCtrl 400 may not have any completion nodes.

Figure 5:
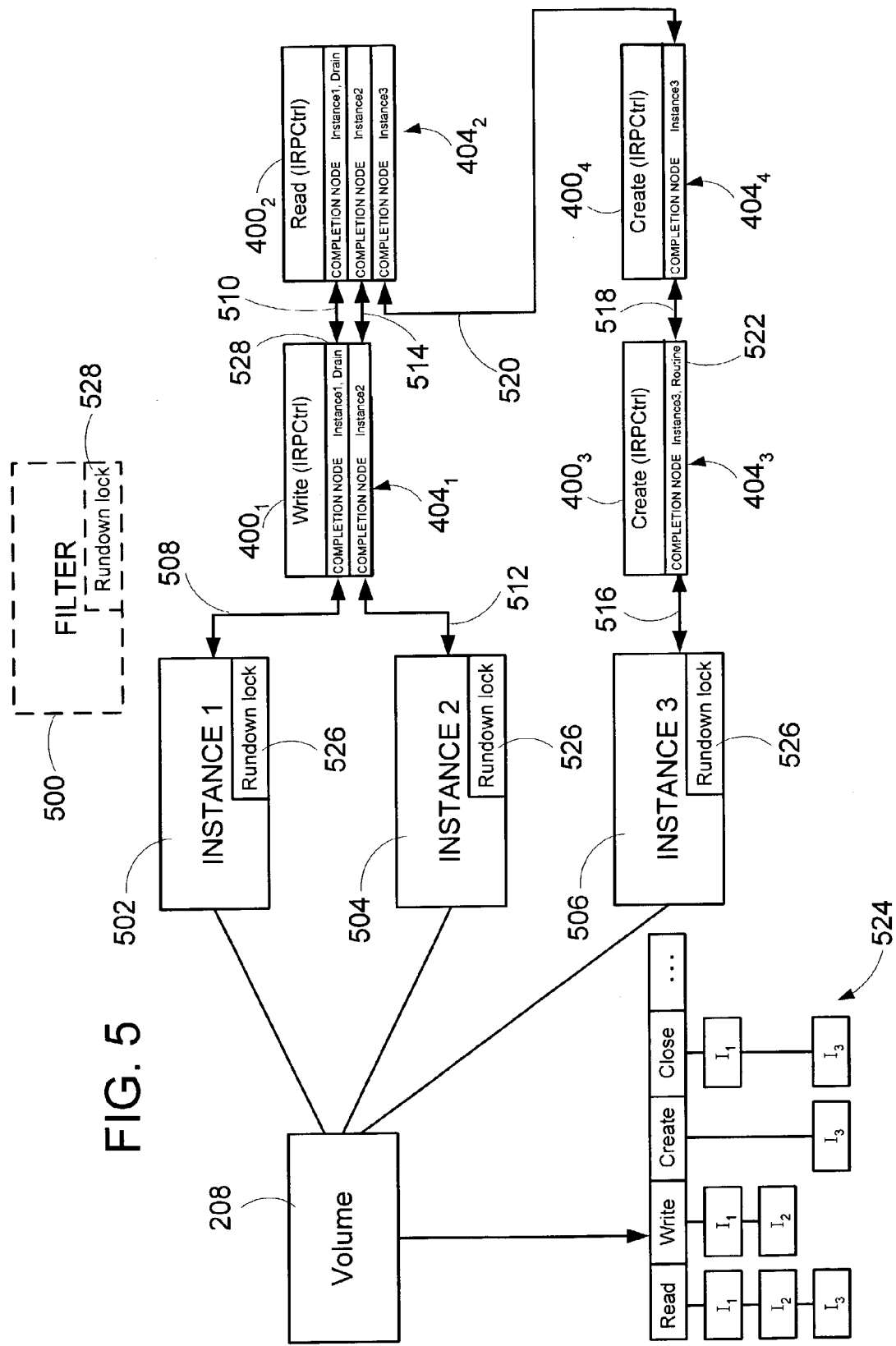
FIG. 5 is a block diagram illustrating a linked list of completion node structures for a volume.

A filter enters the "processing phase" when it returns back to the filter manager 204 from its pre-operation callback and wants to receive a post-operation callback. In other words, the filter has seen the I/O operation (and has finished any pre-operations it has performed), but the I/O operation hasn't returned from being processed further down the stack. The completion node structure for each operation that enters the processing phase is inserted into a linked list associated with its corresponding instance. FIG. 5 illustrates a linked list of completion node structures for a volume 208. Filter 500 has instances 502, 504, 506 attached to volume 208. Completion node structures in completion stacks $404_1$ to $404_4$ are linked to corresponding instances so the instances can track the operations currently being processed. The number of completion nodes in the system will change over time as the number of I/O operations currently being processed by the system changes. Each instance node 502-506 maintains a list of completion nodes for outstanding I/O operations of every operation in which the instance participates as illustrated by lines 508-520. For example, the list maintained by instance 506 includes completion nodes for create I/O operation $400_3$, create I/O operation $400_4$ and read I/O operation $400_2$. I/O operations of various types can be in the list maintained by an instance. One item saved in a completion node is the routine 522 to call. A completion node is removed from this list when the operation leaves the processing phase.

The post-operation phase starts when filter's post-operation callback routine is called. The filter manager 204 uses the completion node stack to keep track of which filters want to enter the post-operation phase for a given operation and instance. For example, if the I/O operation is a read and the file is encrypted, an encryption filter will want to enter the post-operation phase to decrypt the file. During the post-operation phase each filter that is called makes a decision on how to handle the given operation. The filter either has completed its processing of the operation or it defers the operation. If it defers the given operation, the operation is blocked from continued process of the operation until the filter resumes processing. The operation stays in the post-operation phase. At some later time the filter must continue its processing.

Returning now to FIG. 5, the filter manager 204 keeps track of each I/O operation in a volume 208. When a filter registers an instance, the filter indicates the operations that the filter monitors/processes. The volume structure 208 maintains a structure 524 that shows the operations that a given instance of a filter monitors/processes. For example, the operations that instance 506 monitors/processes include read, create, and close operations. The structure 524 is a list of callback nodes which describe the instance and pre- and post-operations to call. The callback nodes are stacked in the order they should be called in as determined by the instance associated with each callback node. The number of callback nodes- for a volume is determined by the number of operations in which each instance has registered callbacks.

The filter manager 204 uses a lock called a rundown lock to prevent a filter or instance of a filter from aquring new operations during the unloading of the filter or the instance of the filter. Rundown locks support controlled deletion of memory structures and work in the following way. Each time a rundown lock in acquired a counter is incremented and each time it is released the counter is decremented. When a structure needs to be deleted a RundownWait routine is called. This routine sets a flag so that no new rundown locks may be acquired and if the rundown count is non-zero waits for the count to go to zero (i.e., waits for any outstanding rundown locks to be released). When the RundownWait routine returns, there are no current locks and no new locks may be acquired. A rundown lock 526 is associated with each instance 502-506 and a global rundown lock 528 is associated with each filter 500. Alternatively, the rundown lock 526 may be placed in structure 524. The global rundown lock 528 is used to account for any other reason that a filter 500 is in memory that is not associated with an instance. For example, the global rundown lock 528 accounts for outstanding I/O operations, timers, number of instances, etc. Further details of one embodiment of rundown protection using rundown locks is in commonly assigned U.S. patent application 10/461,755, filed on the same day herewith and titled "Scalable Rundown Protection For Object Lifetime Management." It is recognized that other synchronization mechanisms may be used to prevent a filter or instance of a filter from acquiring new operations during the unloading of the filter or the instance of the filter.

Figure 6:
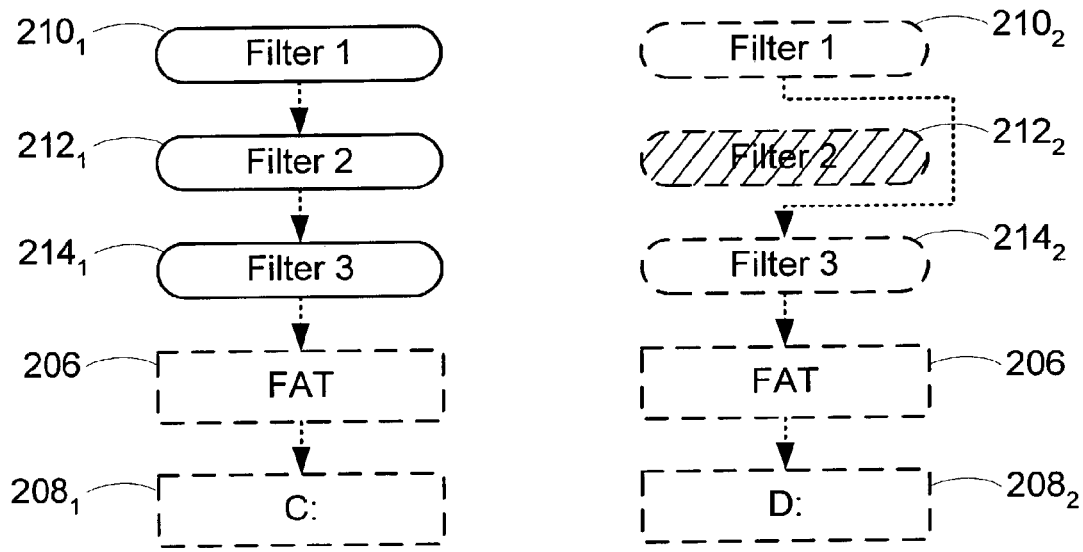
FIG. 6 is a block diagram illustrating an instance of a filter removed from a file system stack in accordance with the teaching of the present invention.
Figure 7:
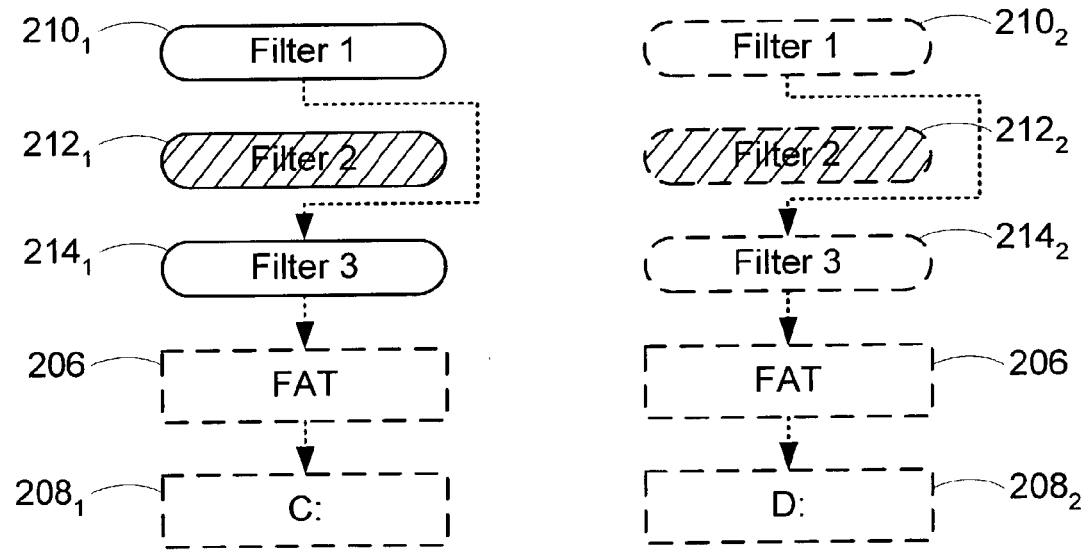
FIG. 7 is a block diagram illustrating a filter removed from a file system stack in accordance with the teaching of the present invention.

As illustrated in FIGS. 6 and 7, the filter manager 204 may remove an instance of a filter (see FIG. 6) or may remove a filter (see FIG. 7). When an instance or a filter is removed, the pre-operations and post-operations bypass the instance or the filter and the filter or instance is removed from memory.

Turning now to FIGS. 8a-8b in conjunction with FIG. 5, the steps the filter manager 204 and a filter takes to remove an instance or to remove the filter are illustrated. The filter manager 204 determines if a filter or an instance of a filter is to be unloaded (step 800). If the filter is to be unloaded, the filter manager 204 sends a FilterUnload message to the filter (step 802). Unloading is optional, so the filter decides if it wants to be unloaded (step 804). A filter that is performing a necessary operation for the computer system is likely to decide not to be unloaded. If the filter decides not to be unloaded, the process ends. If the filter decides to be unloaded, it calls a routine to unregister itself from the filter manager 204.

In response to receiving the routine, the filter manager 204 then begins to unload the filter. The filter manager acquires the rundown lock 524 for the filter. The filter manager 204 then deletes all instances of the filter (step 806). The details of deleting an instance is described below in steps 816 to 846. The filter manager 204 deletes volume contexts (step 808) and waits for outstanding filter references (step 810). The outstanding filter references may be due to entries pending in generic work queue. When the outstanding references are completed, all filter manager objects have been cleaned up. The filter then does all global cleanup, including items such as deleting global resources for the filter, freeing global memory/deleting lookaside lists, and unregistering global callbacks (e.g. process and thread notify routines) (step 812). If the filter returns a valid success code from its FilterUnload routine, the filter driver is unloaded from the system (step 814).

In one embodiment, all instances of a filter are torn down sequentially. If an instance is to be unloaded, all operations that are still associated with the given instance (i.e., the pre-operation phase, processing phase, and post-operation phase) must either be completed or "drained" before the instance can be torn down. For a filter to support instance teardown, the filter registers callback routines with the filter manager. These callback routines include an InstanceTeardownStart and an InstanceTeardownComplete. When instance teardown starts, the filter manager 204 first marks all completion nodes for the given instance that is starting to be torn down (step 816). This marking is used to prevent any new operations from being sent to the given instance.

The filter manager 204 then calls an instance's InstanceTeardownStart routine (step 818). In this routine, the instance must restart or complete operations pended in the pre-operation phase, guarantee the instance won't pend any new operations, and complete deferred operations in the post-operation phase. Additionally, this routine may optionally do the following: cancel long lived filter initiated asynchronous I/Os; close opened files; set state so worker threads start doing a minimal amount of work in preparation for unloading; and stop queuing new work items.

The filter manager 204 then examines the state of each outstanding operation associated with the instance being torn down. It uses the completion nodes for each operation that, as previously explained, are linked into a list off the instance structure (see FIG. 5). The filter manager 204 determines in which stage the operation is. If the operation is in a pre-operation phase (step 820), a rundown lock is taken on the callback node associated with that operation. Alternatively, the rundown lock is associated with the instance and this rundown lock is acquired regardless of the stage the operation is in. The filter manager does a RundownWait on that callback node (step 822). This means the filter manager will wait for the pre-operation phase to complete. Note that this RundownWait is the primary reason why all pended operations must be restarted or completed by the filter during the InstanceTeardownStart callback.

If the operation is in a processing phase, the filter manager 204 determines if the instance switched data buffers via the completion node and linked list (step 826). If the instance does not switch data buffers, the operation is "drained" (step 828). When an operation is to be drained, the completion stage is called prematurely (i.e., before the operation is completed). The filter manager 204 knows which operations to drain because the completion node for this operation is linked into a list off the Instance structure. Turning back to FIG. 5, draining is handled by calling the filter's post-operation callback routine with a flag telling it that the operation is being drained. The only thing a filter may do at this time is free the context structure passed from the pre-operation callback. When the filter manager 204 is in the draining mode, the filter manager 204 walks the list. The list tells which routine 520 the filter manager 204 calls to drain the operation. Once drained, the completion node is marked to indicate the operation is drained (reference 528). The filer manager 204 acquires the lock and removes the instance from the list. If the completion node for the instance indicates drained, the filter manager 204 knows the instance is not in the list by definition. After being drained, the rundown lock on the completion node is released. The filter manager 204 guarantees that a filter's post-operation routine will only be called once for a given operation. A filter won't get a normal completion callback as well as a "drain" callback for the same operation on the same instance.

If the instance did switch data buffers, the operation is not drained. An example of a filter that switches buffers is an encryption filter. An encryption filter may not be able to encrypt the contents of a buffer in place. For example, the filter may not have write access to the buffer. These filters allocate another buffer of at least the same length as the buffer, copy the contents of the buffer into the other buffer and perform processing on the other buffer (e.g., encrypting the data) and send the other buffer down the stack to the file system for processing. These operations cannot simply be drained because only the filter knows how to cleanup and free the swapped buffer. If the operation was drained, the other buffer may remain in memory. This will occur if the file system is doing operations on the buffer while the filter unloads. A buffer swap is detected (and flagged in the completion node) at the end of the pre-operation phase. The outstanding operation is cancelled (step 830) and the filter manager 204 waits for the cancel processing to complete (step 832). This allows the filter to do proper cleanup of the swapped buffer.

In an alternate embodiment, the action taken depends on whether the operation is short-lived or long-lived. An operation is classified as a short-lived operation or a long-lived operation based on the type of operation it is. Many operations are classified as long-lived due to their function. For example, a change directory notification issued by a user is completed the next time the file system performs an operation on the directory specified. The next time could be seconds, minutes, days or weeks away from happening. Operations that are expected to complete in the range of a few seconds (e.g., disk writes) are classified as short-lived operations. All other operations are classified as long-lived operations. For short-lived operations, the filter manager 204 waits for the operation to complete. The completion routine will then do the proper handling and cleanup of the swapped buffer. For long-lived operations, (i.e., operations for which it is not guaranteed to complete in a "short" period of time) the filter manager 204 cancels the outstanding I/O operation and waits for the cancel processing to complete. The completion routine will be called in the context of the canceled I/O operation and the filter can do properly cleanup of the swapped buffer.

If the operation is in the post-operation phase, the filter manager 204 does a RundownWait on the given completion node. Since the rundown lock is still in effect, any operation that is in the post-operation phase will wait for normal processing to complete (step 834). When an operation leaves the post-operation phase the rundown lock is released. If all operations are not drained or completed (step 836), steps 820 to 834 are repeated for each operation.

After all operations have either been drained or completed the filter manager calls the filter's InstanceTeardownComplete callback (step 838). At this point the filter knows there are no more outstanding operations. The filter must cancel any long lived filter initiated asynchronous I/Os (such as oplocks and directory change notifications) and close any files that are still open that were opened by the filter. The filter manager 204 then waits for any other outstanding rundown references on the instance to be released (step 840). These outstanding references could be from any outstanding filter initiated asynchronous I/O. The filter manager 204 then deletes all instance, stream, and stream handle context structures associated with this instance (step 842). The instance structure in then removed from memory (step 844).

It can be seen from the above description that a filter (or one or more instances of a filter) located at any location in the file system stack can be dynamically unloaded at any time with minimal impact on performance. The filter/filter instance can be unloaded with outstanding I/O operations on the filter hosted by the filter or I/O operations pended by other filters. A filter may veto the unloading of the filter unless the computer system is unloading the filter because its corresponding service has been stopped. A filter may veto the unloading of an instance of the filter unless the volume to which the instance is virtually attached is being removed, torn down, etc.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to dynamically unload a filter from memory, the filter a having at least one instance of the filter located at an arbitrary position in a file system stack comprising the steps of:

deleting the at least one instance from memory;

deleting volume contexts associated with the filter;

commanding the filter to perform global cleanup after outstanding filter references have been completed; and unloading the filter from memory.

2. The method of claim 1 wherein the at least one instance has at least one operation in one of a pre-operation phase, a processing phase, and a post operation phase, and wherein the step of deleting the at least one instance from memory includes the steps of:

determining in which of the pre-operation phase, a processing phase, and a post operation phase that the at least one operation is operating; and performing one of draining the at least one operation and completing the at least one operation based on which of the pre-operation phase, a processing phase, and a post operation phase that at least one operator is operating.

3. The method of claim 2 wherein the step of performing one of draining the at least one operation and completing the at least one operation comprises waiting for the at least one operation to complete if the at least one operation is in the post-operation phase.

4. The method of claim 2 wherein the step of performing one of draining the at least one operation and completing the at least one operation comprises:
if the at least one operation is in the processing phase:
if the operation is a short-lived operation, waiting for the operation to complete; and
if the operation is a long-lived operation, canceling the a standing I/O operation and waiting for the cancel processing to complete.

5. The method of claim 2 wherein the step performing one of draining the at least one operation and completing the at least one operation comprises the steps of:
determining if the at least one instance has swapped buffers it the at least one operation is in the processing phase; and
draining the at least one operation if the at least one instance has not swapped buffers.

6. The method of claim 5 wherein the step performing one of draining the at least one operation and completing the at least one operation further comprises the steps of:
canceling the at least one operation if the at least one instance has swapped buffers; and
waiting for the at least one operation to complete canceling.

7. The method of claim 2 wherein the step performing one of draining the at least one operation and completing the at least one operation comprises waiting for the a least one operation to complete if the operation is in the pre-operation phase.

8. The method of claim 2 wherein the step of deleting the at least one instance further includes the steps of:
marking all completion nodes for the at least one instance;
commanding the at least one instance to run an InstanceTeardownStart routine;
commanding the at least one instance to run an InstanceTeardownComplete routine after the at least one operation has been one of drained and completed; and
deleting the at least one instance from memory after the InstanceTeardownComplete routine has run.

9. The method of claim 8 further comprising the steps of:
deleting all instance context structures associated with the instance;
deleting all stream context structures associated with the instance; and
deleting all stream handle context structures associated with the instance.

10. The a method of claim 8 further comprising the step of waiting for remaining rundown references to be released after the instance has run the InstanceTeardownComplete routine.

11. The method of claim 1 wherein the at least one instance has at least one operation in one of a pre-operation phase, a processing phase, and a post operation phase, wherein the step of deleting the at least one instance from memory includes the steps of:
determining in which of the pre-operation phase, a processing phase, and a post operation phase that the at least one operation is operating;
waiting for the at least one operation to complete if the operation is in the post-operation phase;
if the at least one operation is in the processing phase:
determining if the at least one instance has swapped buffers;
draining the at least one operation if the at least one instance has not swapped buffers.
canceling the at least one operation if the at least one instance has swapped buffers;
waiting for the at least one operation to complete canceling; and
waiting for the at least one operation to complete if the operation is in the pre-operation phase.

12. The method of claim 11 further comprising the steps of:
marking all completion nodes for the at least one instance;
commanding the at least one instance to run an InstanceTeardownStart routine;
commanding the at least one instance to run an InstanceTeardownComplete routine after the at least one operation has been one of drained and completed; and
deleting the at least one instance from memory after the InstanceTeardownComplete routine has run.

13. The method of claim 12 further comprising the steps of:
deleting all instance context structures associated with the instance;
deleting all stream context structures associated with the instance; and
deleting all stream handle context structures associated with the instance.

14. The method of claim 12 further comprising the step of waiting for remaining rundown references to be released after the instance has run the InstanceTeardownComplete routine.

15. The method of claim 1 further comprising the steps of:
sending a filterunload message to the filter;
receiving a response from the filter; and
if the response indicates the filter does not want to be unloaded, keeping the filter loaded in memory.

16. The method of claim 1 further comprising the step of acquiring a rundown lock for the at least one instance.

17. A filter manager for unloading one of a filter from memory and an instance of the filter from a filter stack, the filter manager in communication with the filter and the instance of the filter, the filter manager comprising:
first means to track the progress of each I/O operation in the system;
second means to perform one of draining at least one I/O operation linked with the instance and completing a remainder of I/O operations linked with the instance; and
third means to unload the one of the filter from memory and the instance of the filter from the filter stack.

18. The filter manager of claim 17 wherein the filter manager is adapted to:
determine in which of the pre-operation phase, a processing phase, and a post operation phase that the at least one operation is operating;
wait for the at least one operation to complete if the operation is in the post-operation phase;
if the at least one operation is it the processing phase:
determine if the at least one instance has swapped buffers;
drain the at least one operation if the at least one instance has not swapped buffers;
cancel the at least one operation if the at least one instance has swapped buffers;

wait for the at least one operation to complete canceling; and wait for the at least one operation to complete if the operation is in the pre-operation phase.

19. The filter manager of claim 17 wherein the filter manager is further adapted to:
    mark all completion nodes for the at least one instance;
    command the at least one instance to run an InstanceTeardownStart routine;
    command the at least one instance to run an InstanceTeardownComplete routine after the at least one operation has been one of drained and completed; and
    delete the at least one instance from memory after the InstanceTeardownComplete routine has run.

20. The filter manager of claim 19 wherein the filter manager is further adapted to:
    deleting all instance context structures associated with the instance;
    deleting all stream context structures associated with the instance; and
    deleting all stream handle context structures associated with the instance.

21. The filter manager of claim 17 wherein the filter manager is further adapted to wait for remaining rundown references to be released after the instance has run the InstanceTeardownComplete routine.

22. A method of communicating between a file manager and a filter in a file system filter stack comprising the steps of:
    sending an instance teardown start message to the filter when an instance of the filter is to be removed from a filter stack; and
    sending an instance teardown end message to the filter when all operations associated with an instance have been completed or drained and a success response to the instance teardown start message has been received.

23. The method of claim 22 further comprising the step of sending a message containing a drain flag to the filter to indicate an operation is being drained.

24. The method of claim 22 further comprising the steps of:
    sending a filter unload message to the filter;
    receiving a response to the filter unload message, the response indicating whether the filter will allow itself to be unloaded.

25. A method of communicating between a file manager and a filter in a file system filter stack comprising the steps of:
    receiving an instance teardown start message when an instance of the filter is to be removed from a filter stack;
    sending one of a success response and a failure response in response to receiving the instance teardown start message; and
    receiving an instance teardown end message.

26. The method of claim 25 further comprising the steps of receiving a message containing a drain flag to the filter to indicate an operation is being drained and freeing a context structure passed from a pre-operation callback in response to receiving the message containing the drain flag.

27. The method of claim 25 further comprising the steps of:
    receiving a filter unload message; and
    sending a response indicating whether the filter will allow itself to be unloaded in response to receiving the filter unload message.

28. A computer-readable storage medium which stores a set of instructions which when executed performs a method for dynamically unload a filter from memory, the filter having at least one instance of the filter located at an arbitrary position in a file system stack, the method executed by the set of instructions comprising;
    deleting the at least one instance from memory;
    deleting volume contexts associated with the filter;
    commanding the filter to perform global cleanup after outstanding filter references have been completed; and
    unloading the filter from memory.

29. The computer-readable medium of claim 28 wherein the at least one instance has at least one operation in one of a pre-operation phase, a processing phase, and a post operation phase, and wherein the step of deleting the at least one instance from memory includes the steps of;
    determining in which of the pre-operation phase, a processing phase, and a post operation phase that the at least one operation is operating; and
    performing one of draining the at least one operation and completing the at least one operation based on which of the pre-operation phase, a processing phase, and a post operation phase that at least one operation is operating.

30. The computer-readable medium of claim 29 wherein the step of performing one of draining the at least one operation and completing the at least one operation comprises:
    waiting for the at least one operation to complete the operation is the post-operation phase;
    determining if the at least one instance has swapped buffers if the at least one operation is in the processing phase and performing one of draining the at least one operation if the at least one instance has not swapped buffers and canceling the at least one operation if the at least one instance has swapped buffers;
    waiting or he at least one operation to complete canceling if the at least one operation is canceled; and
    waiting for the at least one operation to complete if the operation is in the pre-operation phase.

31. The computer-readable medium of claim 28 wherein the step of deleting the at least one instance further includes the steps of:
    marking all completion nodes for the at least one instance;
    commanding the at least one instance to run an InstanceTeardownStart routine;
    commanding the at least one instance to run an InstanceTeardownComplete routine after the at least one operation has been one of drained and completed; and
    deleting the at least one instance from memory after the InstanceTeardownComplete routine has run.

32. The computer-readable medium of claim 31 having further computer-executable instructions for performing the steps comprising:
    deleting all instance context structures associated with the instance;
    deleting all stream context structures associated with the instance; and
    deleting all stream handle context structures associated with the instance.

33. The computer-readable medium of claim 31 having further computer-executable instructions for performing the steps comprising waiting for remaining rundown references to be released after the instance has run the InstanceTeardownComplete routine.

34. The computer-readable medium of claim 28 having further computer-executable instructions for performing the steps comprising:
    sending a filterunload message to the filter;
    receiving a response from the filter; and if the response indicates the filter does not want to be unloaded, keeping the filter loaded in memory.

35. The computer-readable medium of claim 28 having further computer-executable instructions for performing the step comprising acquiring a rundown lock for the at least one instance.

36. A method to dynamically unload an instance of a filter located at an arbitrary position in a file system stack, the instance having at least one operation in one of a pre-operation phase, a processing phase, and a post operation phase, the method comprising the steps of:
    determining in which of the pre-operation phase, a processing phase, and a post operation phase that the at least one operation is operating; and
    performing one of draining the at least one operation and completing the at least one operation based on which of the pre-operation phase, a processing phase, and a post operation phase that at least one operation is operating; and
    deleting the instance from memory.

37. The method of claim 36 wherein the step of performing one of draining the at least one operation and completing the at least one operation comprises waiting for the at least one operation to complete if the operation is in the post-operation phase.

38. The method of claim 36 wherein the step of performing one of draining the at least one operation and completing the at least one operation comprises:
    if the at least one operation is in the post-operation phase;
        if the operation is a short-lived operation, waiting for the operation to complete;
        if the operation is a long-lived operation, canceling the outstanding I/O operation and waiting for the cancel processing to complete.

39. The method of claim 36 wherein the step performing one of draining the at least one operation and completing the at least one operation comprises the steps of:
    determining if the instance has swapped buffers if the at least one operation is in the processing phase; and
    draining the at least one operation if the instance has not swapped buffers.

40. The method of claim 39 wherein the step performing one of draining the at least one operation and completing the at least one operation further comprises the steps of:
    canceling the at least one operation if the instance has swapped buffers; and
    waiting for the at least one operation to complete canceling.

41. The method of claim 36 wherein the step performing one of draining the at least one operation and completing the at least one operation comprises waiting for the at least one operation to complete if the operation is in the pre-operation phase.

42. The method of claim 36 wherein the step of deleting the instance further includes the steps of:
    marking all completion nodes for the instance;
    commanding the instance to run an InstanceTeardownStart routine;
    commanding the instance to run an InstanceTeardownComplete routine after the at least one operation has been one of drained and completed; and
    deleting the instance from memory.

43. The method of claim 42 further comprising the steps of:
    deleting all instance context structures associated with the instance;
    deleting all stream context structures associated with the instance; and
    deleting all stream handle context structures associated with the instance.

44. The method of claim 42 further comprising the step of waiting for remaining rundown references to be released after the instance has run the InstanceTeardownComplete routine.

45. The method of claim 36 further comprising the step of acquiring a rundown lock for the instance.

* * * * *